United States Patent [19]

Henderson

[11] Patent Number: 4,709,143
[45] Date of Patent: Nov. 24, 1987

[54] PHOTOELECTRIC BIN LEVEL SENSOR AND METHOD OF INSTALLING THE SAME

[76] Inventor: Edwin L. Henderson, 53 Betty St., Ukiah, Calif. 95482

[21] Appl. No.: 768,553

[22] Filed: Aug. 22, 1985

[51] Int. Cl.⁴ .............................................. G01V 9/04
[52] U.S. Cl. ................................ 250/222.1; 250/577; 340/619
[58] Field of Search .................. 73/293, 152; 221/6, 221/221; 250/222.1, 576, 577, 239, 573, 564; 340/617, 619, 612; 324/65 P; 431/37

[56] References Cited

U.S. PATENT DOCUMENTS

| | | | |
|---|---|---|---|
| 2,918,585 | 12/1959 | Farmer | 250/239 |
| 3,553,471 | 1/1971 | Maigret | 340/617 |
| 4,100,538 | 7/1978 | Knepler | 340/617 |

FOREIGN PATENT DOCUMENTS 0190224 11/1982 Japan ..................................... 73/293

Primary Examiner—Edward P. Westin
Assistant Examiner—Jessica L. Ruoff
Attorney, Agent, or Firm—Schapp and Hatch

[57] ABSTRACT

A photoelectric bin level sensor comprising a housing from which projects a source probe and a detector probe, the source probe and the detector probe both are bent at an angle of approximately 100 degrees so as to point substantially downward. Said probes project from the housing and are located closely adjacent to the lower edge thereof so that probes can be conveniently passed through two holes drilled in a wall of a particulate matter storage tank.

7 Claims, 6 Drawing Figures

PHOTOELECTRIC BIN LEVEL SENSOR AND METHOD OF INSTALLING THE SAME

BACKGROUND OF THE INVENTION

1. Field of the Invention

My invention relates to bin level sensors for sensing the presence of particulate material, such as comminuted, granular, or pulverous material, at a particular level in a bin or hopper, and more particularly to photoelectric bin level sensors.

2. Description of the Prior Art (It is to be understood that the term "prior art" as used herein or in any statement made by or on behalf of applicant means only that any document or thing referred to as prior art bears, directly or inferentially, a date which is earlier than the effective date hereof.)

Photoelectric bin level sensors are known in the prior art. For example, a photoelectric bin level sensor is shown and described in U.S. Pat. No. 4,100,538, which was issued to John T. Knepler on July 11, 1978. A copy of this prior art patent is submitted herewith.

Photoelectric level sensors for liquids and sludges in tanks are also known in the prior art, as seen in U.S. Pat. Nos. 1,958,252; 3,441,737; 3,644,914; and 3,683,347.

Electromechanical bin level sensors for particulate materials in bins and hoppers, such as those which sense the presence of particulate material by means of the resistance of that material to the rotation of a motor-rotated paddle or vane, are also well known in the prior art. Such a rotating paddle bin level sensor is shown and described in U.S. Pat. No. 4,147,906, which was issued to Walter E. Levine on Apr. 3, 1979.

Other types of bin level sensor, based upon different operating principles, such as diaphragm displacement, electrical capacitance, ultrasound, low frequency vibration, and radio frequency electromagnetic radiation, are also known in the prior art.

With the exception of the diaphragm displacement devices, which have their own problems, the prior art devices in general comprise relatively long or bulky probes, which protrude into the bin or hopper and contact the particulate material stored therein. These elongated or bulky probes are likely to be damaged by the weight of the particulate material in the bin or hopper.

The rotating paddle type bin level sensors of the prior art are relatively costly, being typically priced at $120 to $200 each, and are generally unreliable, in that in most applications such a sensor will last no more than a few months at a time without repair.

The prior art devices described above which have no moving parts suffer in general from other problems, such as high cost and insensitivity, i.e., too small an output signal difference between the presence of material in the bin and the absence of material from the bin, which causes an unreliable signal as operating conditions change. Additionally, the bin level sensors of this class generally employ bulky or elongated sensing probes which are subject to damage by the weight of the material in the bin or hopper.

SUMMARY OF THE INVENTION

Accordingly, it is an object of my invention to provide photoelectric bin level sensors the source and detector probes of which are short and sturdy and lie close to the bin wall.

Another object of my invention is to provide photoelectric bin level sensors the source and detector probes of which are non-bridging as compared with the probe pairs of prior art devices.

Yet another object of my invention is to provide photoelectric bin level sensors the probes of which are largely self-cleaning.

A further object of my invention is to provide photoelectric bin level sensors which are considerably easier to install in their associated bins or hoppers than prior art bin level sensors.

A yet further object of my invention is to provide photoelectric bin level sensors the probes of which are relatively immune from damage by the weight of the particulate materials stored in the associated bin or hopper.

An additional object of my invention is to provide photoelectric bin level sensors which are characterized by high sensitivity, i.e., a large difference in output signal level between the presence and the absence of material in the associated bin or hopper at or above the level at which the sensor is mounted.

Another object of my invention is to provide a photoelectric bin level sensor which can be rapidly and easily installed in a bin or hopper by means of easily drilled probe clearance holes and easily drilled and tapped mounting holes without disassembling the bin level sensor.

Other objects of my invention will in part be obvious and will in part appear hereinafter.

My invention, accordingly, comprises the several steps and the relation of one or more of such steps with respect to each of the others, and the apparatus employing features of construction, combinations of elements, and arrangements of parts, including those which are adapted for use in carrying out such steps, all as exemplified in the following disclosure and shown in the accompanying drawings, and the scope of my invention will be indicated in the appended claims.

In accordance with a principal feature of my invention the probes of a photoelectric bin level sensor extend through the wall of the bin and thence downwardly along the inner face of the bin wall and at an angle thereto.

In accordance with another principal feature of my invention said angle (sometimes called the "probe angle" herein) is preferably less than 15 degrees.

In accordance with yet another principal feature of my invention the light source means of said photoelectric bin level sensor is contained within the angularly disposed outer end of the source probe thereof.

In accordance with a further principal feature of my invention said light source means comprises a plurality of light sources.

In accordance with yet a further principal feature of my invention the photodetector means of said photoelectric bin level sensor is contained within the angularly disposed outer end of the detector probe thereof.

In accordance with another principal feature of my invention said photodetector means comprises a plurality of photodetectors.

In accordance with yet another principal feature of my invention said light sources and said photodetectors are so small that said outer ends of both said source probes and said detector probes can be as little as ⅜ inch in diameter.

In accordance with a further principal feature of my invention each photoelectric bin level sensor of certain preferred embodiments thereof comprises a body or housing having a substantially flat face from which the source and detector probes project, the inner end of each probe, i.e., the end adjacent the body, being substantially straight and perpendicular to said substantially flat face, and the outer end of each probe being substantially straight and subtending said probe angle with said substantially flat face.

In accordance with a yet further principal feature of my invention said body or housing contains light source exciting means for exciting said light source means to provide at least one light beam directed to impinge upon said photodetecor means, and photodetector signal utilizing means for utilizing the signals produced by said photodetector means to provide signals indicating the presence or absence of particulate material in the associated bin at the level at which the bin level sensor is installed.

In accordance with another principal feature of my invention a plurality of light sources contained within the source probe of a photoelectric bin level sensor of a preferred embodiment of my invention are connected in parallel across a single light source exciting means contained within the housing of the photoelectric bin level sensor.

In accordance with yet another principal feature of my invention a plurality of photodetectors contained within a detector probe of a photoelectric bin sensor of a preferred embodiment of my invention are connected to supply signals to a single photodetector signal utilizing means contained within the housing of the photoelectric bin level sensor.

In accordance with an additional principal feature of my invention a photoelectric bin level sensor of my invention is so constructed and arranged that it can be installed in a bin by (1) drilling two probe-receiving holes through the wall of the bin, (2) drilling and tapping a plurality of mounting holes in the wall of the bin, (3) passing the probes through the probe-receiving holes and into the bin, and (4) securing the housing of the photoelectric bin level sensor to the wall of the bin by means of screws received in said tapped mounting holes.

For a fuller understanding of the nature and objects of my invention, reference should be had to the following detailed description, taken in connection with the accompanying drawings.

DESCRIPTION OF THE PREFERRED EMBODIMENT

Figure 1:
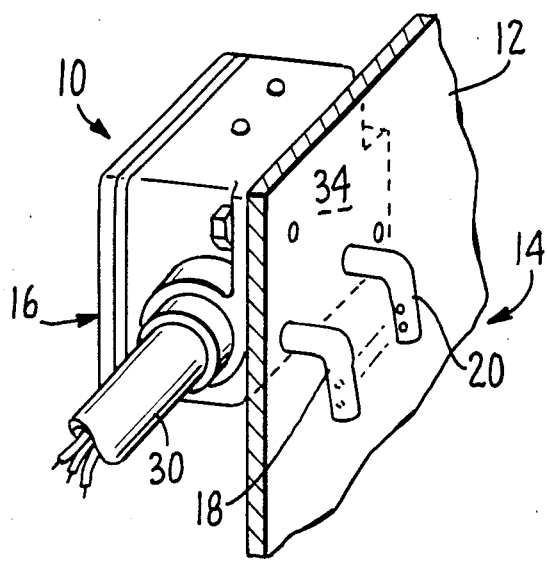
FIG. 1 is a perspective view, partly in phantom, of a photoelectric bin level sensor embodying my invention, installed in a wall of a bin.

Referring now to FIG. 1, there is shown a photoelectric bin level sensor 10 embodying my invention.

Figure 2:
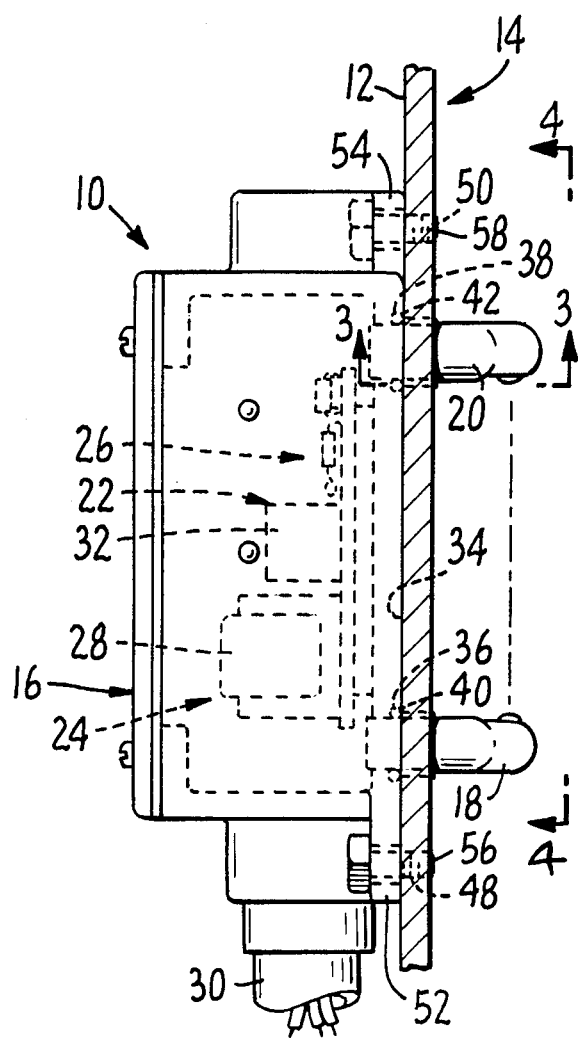
FIG. 2 is a plan view, partly in phantom, of the bin level sensor and bin wall shown in FIG. 1.

As seen in FIGS. 1 and 2, bin level sensor 10 is mounted upon the wall 12 of a bin or hopper which is adapted to contain particulate material in the well known manner.

(The term "particulate material" as used herein denotes any material which is comprised of a plurality of distinct, unjoined particles, including but not limited to grains, coals, powders, and the like, and is not limited to any particular particle size or range of particle sizes in a single body of particulate material.)

It is to be understood that in FIGS. 1 and 2 only a small part of the wall 12 of the bin 14 is shown, and that in both of these figures the interior of bin 14 is to the right of the illustrated portion of bin wall 12, and the exterior of bin 14 is to the left thereof.

Thus, as seen in FIGS. 1 and 2, the principal part of bin level sensor 10 is located outside bin 14.

Comparing FIGS. 1 and 2, it will be seen that bin level sensor 10 is comprised of a sturdy body member or housing 16 and a pair of probes 18, 20 projecting therefrom.

Figure 6:
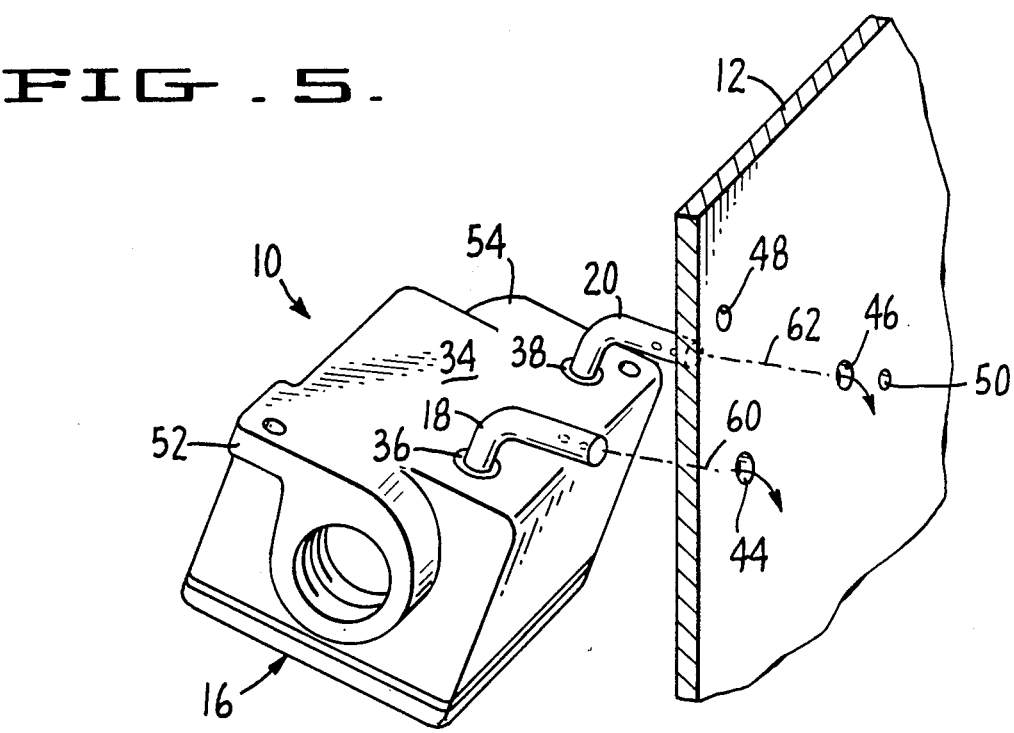
FIG. 6 is a perspective view of a bin level sensor of my invention illustrating the manner of installing it in a bin wall in accordance with my invention.

Another view of the complete bin level sensor 10 is shown in FIG. 6.

As seen in phantom in FIG. 2, housing 16 contains circuit means 22. Circuit means 22 comprises light source exciting circuit means 24 and photodetector signal utilizing means 26.

Neither light source exciting means 24 nor photodetector signal utilizing means 26 is shown in detail, since circuits of both kinds are well known to those having ordinary skill in the art and do not constitute a part of my invention.

By of way of example only, and not in a limiting sense, light source exciting circuit means 24 may comprise a transformer 28 which is constructed and arranged to step down an alternating current line voltage which is supplied by two wires of a cable 30 to a lower alternating current voltage which is in turn rectified by a suitable solid state rectifier circuit 32, which rectifier circuit itself provides the low direct current voltage necessary to excite the two light emitting diodes in source probe 18, and cause the same to emit the beams of high intensity light necessary to excite the corresponding phototransistors in photodetector probe 20.

Similarly, photodetector signal utilizing circuit means 26 may be a simple amplifying and limiting circuit of well known type which serves to amplify the output of the phototransistors contained in photodetector probe 20 and to provide a predetermined output voltage signal level only when at least one of those phototransistors is impinged upon by substantially the full intensity of one of the light beams from source probe 18. This output voltage signal is preferably adapted to be conveyed to an external circuit, such as a bin loading control curcuit, via a pair of the wires of cable 30.

It is to be understood, however, that the scope of my invention is not limited to devices embodying the source exciting curcuit means and photodetector signal utilizing circuit means just described, since many alternative circuit means suitable for use in carrying out my invention will occur to those having ordinary skill in the art without the exercise of invention or undue experimentation.

Comparing FIGS. 1, 2, and 6, it will be seen that source probe 18 and detector probe 20, which constitute principal features of my invention, project outwardly from the flat mounting face 34 (FIG. 6) of housing 16, each of these probes being securely fastened in a close-fitting opening which passes through mounting face 34.

As best seen in FIG. 6, each of these openings is preferably surrounded by a channel 36, 38 adapted to co-act with an O-ring 40, 42 (FIG. 2) or other well known sealing means to prevent the leakage of particulate material from bin 14. Such sealing means and their cooperating channels will not be found to be useful or necessary in all embodiments of my invention.

Further, by comparison of FIGS. 1, 2, and 6, it will be seen by those of ordinary skill in the art that bin level sensor 10 may be easily and cheaply mounted in bin wall 12.

The first step of mounting bin level sensor 10 is to drill two clearance holes 44, 46 (FIG. 6) for loose-fittingly receiving the respective probes 18, 20.

The next step is to drill through bin wall 12 and tap two mounting screw receiving holes 48, 50.

(The proper relative placement and sizes, etc., of these four holes may, for example, be determined from a template supplied with the bin level sensor of the invention.) As further seen by comparison of these figures, housing 12 is provided with two ears 52, 54 each of which contains a clearance hole adapted to receive one of the above said mounting screws (56, 58) which cooperate with tapped holes 48, 50, respectively.

Having drilled and tapped the above said four holes, bin level sensor 10 may then be mounted on bin wall 12 as follows.

(I) Bin level sensor 10 is positioned outside bin wall 12 adjacent holes 44, 46, 48, 50 as shown in FIG. 6.

(II) Bin level sensor 10 is then displaced toward bin wall 12 in such manner that the tips of probes 18, 20 follow the dashed lines 60, 62 (FIG. 6) until they pass through clearance holes 44, 46 (FIG. 6).

(III) Bin level sensor 10 is then so manipulated as to pass probes 18, 20 through clearance holes 44, 46 until at least part of flat mounting face 34 of bin level sensor 10 bears directly against the outer face of bin wall 12, as shown in FIGS. 1 and 2.

(IV) Bin level sensor 10 is then secured in this position by means of machine screws 56, 58, which pass through the abovesaid clearance holes in ears 52, 54 (FIGS. 2 and 6) and are engaged with the threads in tapped holes 48, 50.

(V) Suitable power and output connections are then completed via the insulated conductors contained in cable 30, the nature of such connections being apparent to those having ordinary skill in the art, informed by the present disclosure and the specific structural details of a particular embodiment of my invention, without themselves engaging in invention or undue experimentation.

As seen in FIG. 2, O-rings 40, 42 will now be tightly clamped between bin level sensor 10 and bin wall 12, thus preventing particulate material from leaking through holes 44, 46.

Figure 3:
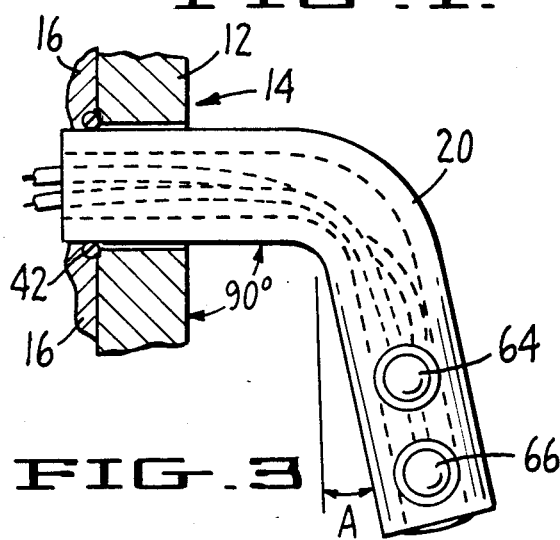
FIG. 3 is a partial elevational view taken along line 3—3 of FIG. 2.

Further, as seen in FIG. 3, when housing 16 is thus tightly secured to the outer face of bin wall 12 the upper portion of probe 20 will be substantially perpendicular to the inner face of bin wall 12, and the lower portion of probe 20 will be so disposed as to subtend an angle A of approximately ten degrees with a line perpendicular to the axis of the upper portion of probe 20. Put differently, if the axis of the upper portion and the axis of the lower portion of probe 20 were drawn on their common plane, the smaller angle subtended therebetween would be about one hundred degrees.

As will be evident to those having ordinary skill in the art, informed by the present disclosure, the upper and lower portions of probe 18 will be disposed with respect to the inner face of bin wall 12 in the same manner in which the upper and lower portions of probe 20 are disposed with respect to the inner face of bin wall 12. That is to say, the axis of the upper portion of probe 18 will be substantially perpendicular to the inner face of bin wall 12, and the axis of the lower portion of probe 18 will deviate from a perpendicular to the axis of the upper portion thereof by an angle A of approximately ten degrees.

Figure 4:
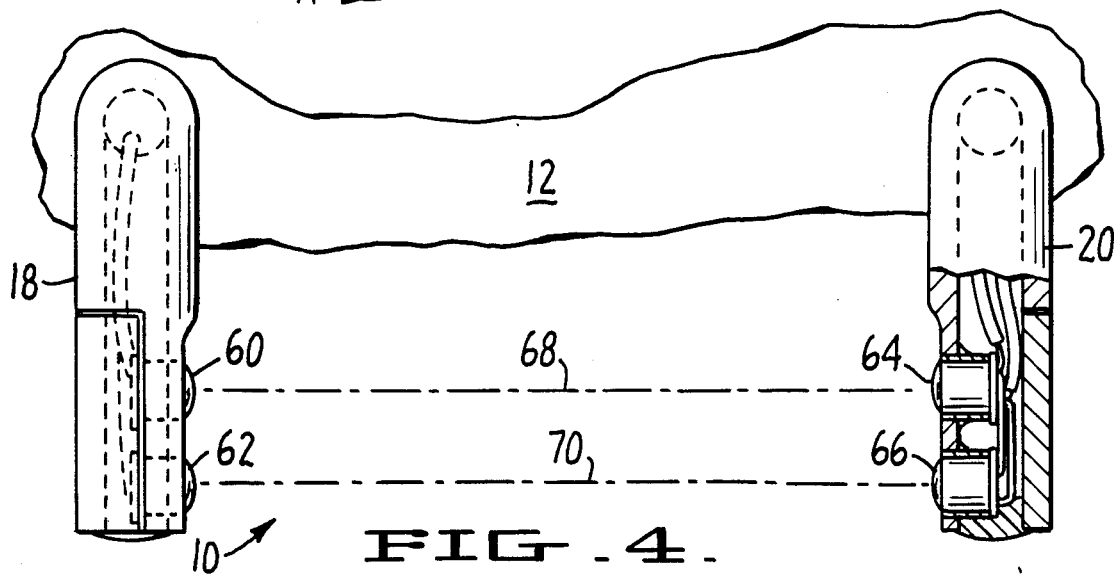
FIG. 4 is a partial elevational view taken along line 4—4 of FIG. 2.
Figure 5:
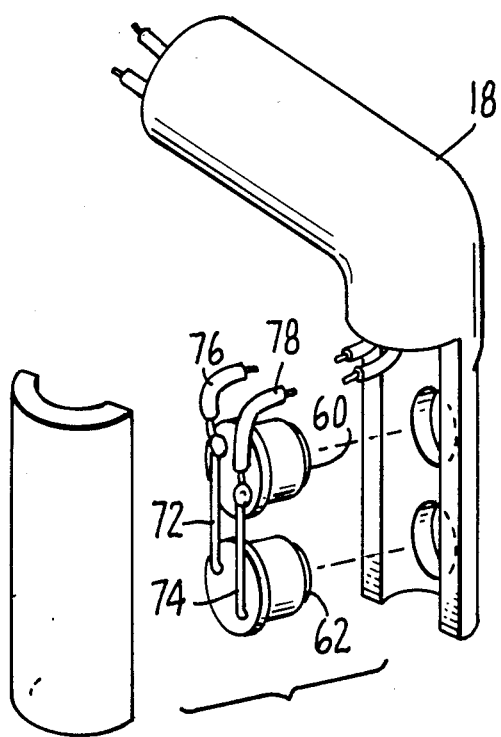
FIG. 5 is an exploded view of the source probe of the bin level sensor shown in FIG. 2.

Comparing FIGS. 4 and 5, it will be seen that when probes 18 and 20 are disposed through bin wall 12 in the manner just described, the light emitting diodes 60, 62 mounted in source probe 18 and the phototransistors 64, 66 mounted in detector probe 20 will be so juxtaposed that source-detector pair 60, 64 will be aligned along a common axis 68, and source-detector pair 62, 66 will be aligned along a common axis 70, as illustrated in FIG. 4.

In accordance with the principles of my invention, and as shown in FIG. 5, light emiting diodes 60, 62 may be connected in parallel across a common exciting source 24 by means of leads 72, 74, 76, 78, etc.

Similarly, in accordance with the principles of my invention, the output terminals of photodetectors 64, 66 may be connected in parallel across the input terminals of a common photodetector signal utilizing circuit 26.

Thus, as will be seen by those having ordinary skill in the art, informed by the present disclosure, two source-detector pairs are provided in the device of the preferred embodiment of my invention to insure against the interruption of level detection operation by the blockage of one of the axis 68, 70 by particulate matter bridged between probes 18 and 20. Additional source-detector pairs could, of course, be provided in probes 18, 20 within the scope of my invention. However, I have discovered by experimentation with actual physical embodiments of my invention closely resembling the preferred embodiments shown in the present drawings that two source-detector pairs are quite sufficient to obtain satisfactory level detection operation in many practical situations.

It is to be particularly noted that while in the preferred embodiment the light emitting diodes 60, 62 and the phototransistors 64, 66 are located in the probes 18, 20, respectively, my invention is by no means limited to such a probe construction. Rather, in some embodiments of my invention the light emitting diodes and phototransistors may be located in housing 16, in which case the light emitted by the light emitting diode or diodes will be conducted along probe 18 by optical fibers or "light pipes" the remote ends of which are directed along axes 68, 70; and similarly optical fibers or "light pipes" will be provided to pick up light at the opposite ends of axes 68, 70 and conduct the same to the phototransistors in housing 16 via probe 20.

It will thus be seen that the objects set forth above, among those made apparent from the preceding description, are efficiently attained, and since certain changes may be made in the above constructions and the method carried out thereby without departing from the scope of my invention, it is intended that all matter contained in the above description or shown in the accompanying drawings shall be interpreted as illustrative only, and not in a limiting sense.

It is also to be understood that the following claims are intended to cover all of the generic and specific features of my invention hereindescribed, and all statements of the scope of my invention which, as a matter of language, might be said to fall therebetween.

What is claimed is:

1. A bin level sensor for particulate material, comprising:
   a housing;
   a source probe projecting from a face of said housing;
   a detector probe projecting from said face of said housing;
   each of said probes comprising an inner portion adjacent to said face and substantially perpendicular thereto and an outer portion remote from said face which subtends an angle of between 85 degrees and 135 degrees with its associated inner portion, resulting in probes pointing substantially downward;
   each of said probes being located closely adjacent to the lower edge of said face so as to make possible the insertion of said probes through two holes in the wall of a bin.

2. A bin level sensor as claimed in claim 1 in which said source probe comprises a plurality of light emitting means adapted to emit light from the outer portion of said source probe in the direction of said detector probe.

3. A bin level sensor as claimed in claim 1 in which said detector probe comprises a plurality of light receiving means adapted to receive light impinging upon the outer portion of said detector probe and originating at said source probe.

4. A bin level sensor as claimed in claim 2 in which said light emitting means are light emitting diodes.

5. A bin level sensor as claimed in claim 3 in which said light receiving means are phototransistors.

6. A bin level sensor as claimed in claim 1 further comprising light emitting means and light receiving located respectively in the outer portion of said source probe and the outer portion of said detector probe.

7. A bin level sensor as claimed in claim 1, further comprising fastener receiving means for receiving means fasteners for fastening said housing to a bin wall with said face bearing thereagainst and said probes passing through holes therein.

* * * * *